United States Patent

McNeilly et al.

[15] 3,649,757

[45] Mar. 14, 1972

[54] FRAME SYNCHRONIZATION ARRANGEMENT FOR PCM SYSTEMS

[72] Inventors: Joseph Hood McNeilly, Harlow, Essex; Paul Barton, Bishop's Stortford, both of England

[73] Assignee: International Standard Electric Corporation, New York, N.Y.

[22] Filed: Aug. 21, 1969

[21] Appl. No.: 851,988

[30] Foreign Application Priority Data

Sept. 20, 1968 Great Britain ....................44,729/68

[52] U.S. Cl. ........................178/69.5 R, 179/15 BS, 325/41, 325/321

[51] Int. Cl. ..........................................H04l 7/00

[58] Field of Search ..............178/69.5 R; 179/15 AP, 15 BS; 325/41, 321

[56] References Cited

UNITED STATES PATENTS

| | | | |
|---|---|---|---|
| 2,927,965 | 3/1960 | Waer | 179/15 |
| 3,482,044 | 12/1969 | Kaneko | 178/53 |
| 3,484,555 | 12/1969 | Ching et al | 179/15 |
| 3,518,377 | 6/1970 | Dworkin | 179/15 |
| 3,175,157 | 3/1965 | Mayo et al. | 325/321 |
| 3,404,231 | 10/1968 | Aaron et al. | 178/69.5 |

*Primary Examiner*—Robert L. Richardson
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

The decoder produces output containing a detectable signal component equal to one-half the frame repetition rate when an out of sync condition is present. A bandpass filter detects the signal component and produces a pulse which is inserted into the bit clock from which the frame clock is derived for operating the decoder. The frame clock is shifted one bit each frame until a sync condition is achieved and the signal component disappears. A feedback circuit inhibiting the filter output is provided to prevent for a given time interval generating a succession of additional pulses after the first extra pulse is inserted into the bit clock.

10 Claims, 2 Drawing Figures

Inventors
JOSEPH H. Mc NEILLY
PAUL BARTON
By Alfred C. Hill
Agent

Inventors
JOSEPH H. McNEILLY
PAUL BARTON
By Alfred C. Hill
Agent

FRAME SYNCHRONIZATION ARRANGEMENT FOR PCM SYSTEMS

BACKGROUND OF THE INVENTION

This invention relates to pulse code modulation (PCM) communication systems and more particularly to an arrangement for achieving frame synchronization in such PCM systems.

In such systems two types of synchronization are required, frame synchronization and bit synchronization. In a single-channel PCM system, to which this invention is particularly applicable, no separate synchronizing channel is available and so frame synchronization must be derived from the coded intelligence channel signal itself. In a multichannel system, it is usually possible to allocate one channel for exclusive use as a synchronization channel. However, it can happen that even in a multichannel system all the channels are required for speech and there is no channel that can be spared for synchronization. Again, frame synchronization must then be derived from coded intelligence channel signal or signals.

SUMMARY OF THE INVENTION

An object of the present invention is to provide a frame synchronization arrangement based on the fact that for a wide range of coded signal levels a detectable signal component exists at the unfiltered decoder output when frame synchronization is incorrect. Such a signal has a frequency equal to one-half the sampling or frame repetition frequency.

A feature of this invention is the provision of a frame synchronization arrangement for PCM systems comprising a decoder providing as a part of its output signal a signal component having a frequency equal to one-half the frame repetition rate of the system when an out-of-synchronization condition is present; first means coupled to the output of the decoder to detect the signal component; and second means coupled to the output of the first means and the decoder responsive to the detection of the signal component to adjust the operation of the decoder to establish a synchronized condition.

Another feature of this invention is the provision of a feedback circuit arrangement inhibiting the first means output signal to prevent for a given time interval generating a succession of additional pulses after the first extra pulse is inserted into the bit clock stream.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figure 1:
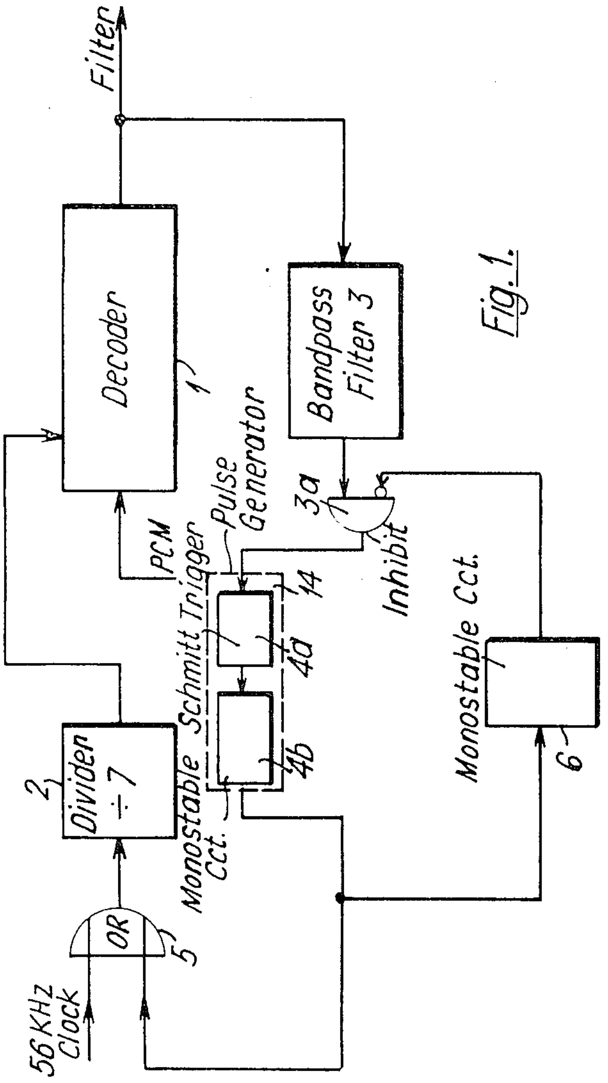
FIG. 1 is a block diagram of a frame-synchronizing arrangement in accordance with the principles of this invention.

In the arrangement shown in FIG. 1 decoder 1 is a single-channel PCM decoder the output of which is a quantized analog signal, i.e., the result of decoding the individual PCM code groups to yield the equivalent of the quantized samples which were coded at the transmitter. The output waveform of the decoder should look like the waveform shown in FIG. 2(*d*). This signal would then be passed on to a filter circuit (not shown) to produce the final audio output signal. At the decoder output, however, the signal is still a series of discrete samples.

Figure 2:
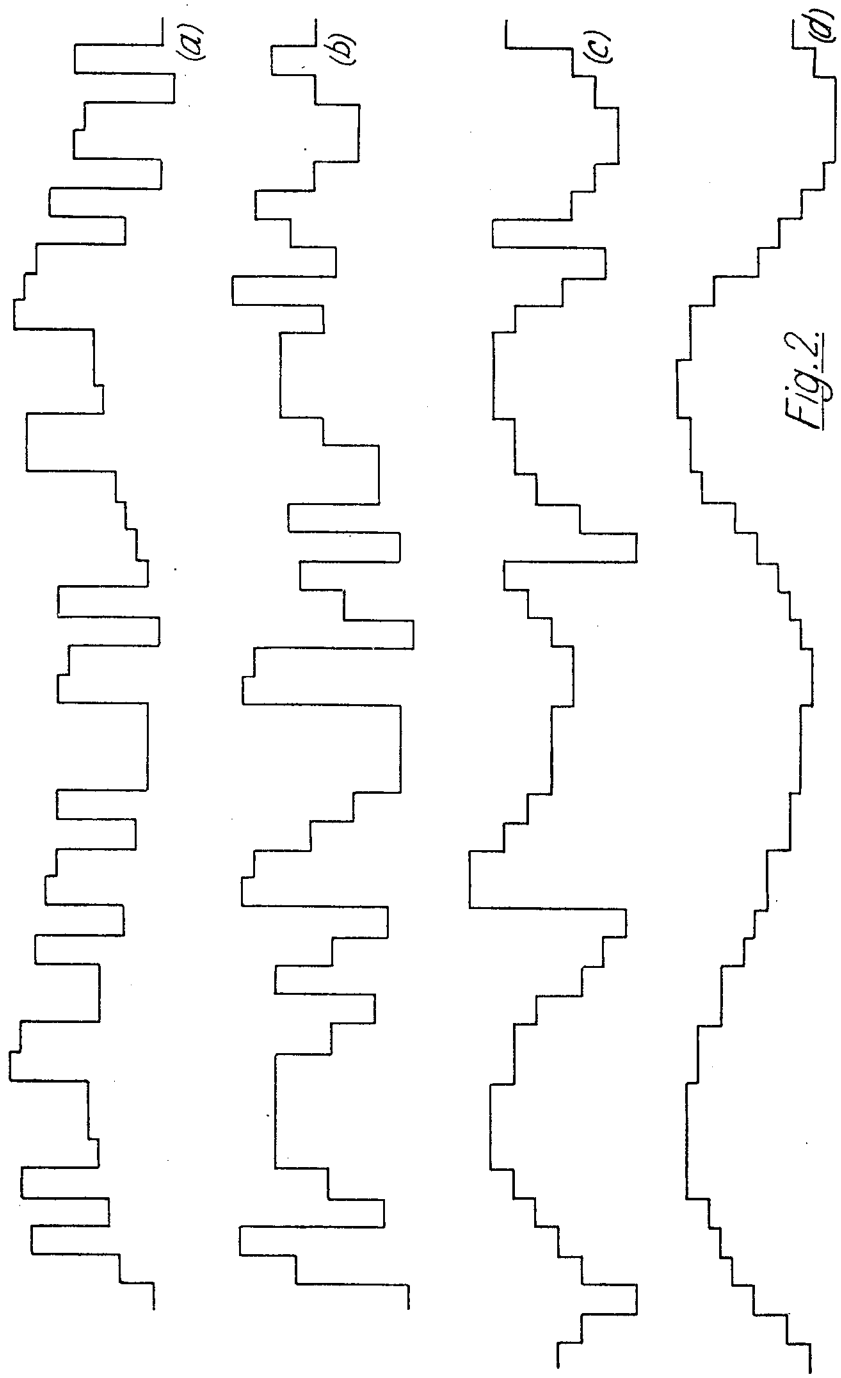
FIG. 2 illustrates certain waveforms observable in the decoder output of FIG. 1.

The waveform in FIG. 2(*d*) is that appearing in the decoder output of a 4-digit linear decoder when frame synchronization is correct. If frame synchronization is lost, i.e., the frame pulse for the decoder is one bit late, then the decoder output may appear like that shown in FIG. 2(*a*). FIG. 2(*b*) and 2(*c*) show what the decoder output waveform might look like if the frame pulses are two or three bits late, respectively. It is obvious that the integrated output changes from a recognizable audio waveform to an incomprehensible signal if frame synchronization is lost.

We have observed in a single-channel PCM system, however, that for a wide range of coded signal levels a detectable signal component having a frequency equal to one half the sampling or frame repetition frequency exists at the unfiltered decoder output for all incorrectly positioned frame pulses. This frequency virtually disappears when correct frame synchronization is achieved.

The theoretical basis for the above-mentioned observed phenomenon lies in the well-known and well-established Sampling Theory. In particular, in order to produce a signal of frequency $f$, it is necessary to sample at a frequency slightly greater than $2f$. Alternatively, if the sampling frequency is exactly $2f$, it is not possible to transmit a signal of frequency $f$. Hence, in any single channel PCM decoder output, when the system is synchronized, there is, theoretically, no component at half the sampling frequency.

However, if the decoder is not in frame synchronization, the above Sampling Theory does not apply since the amplitude of the decoded sample bears no direct relationship to the amplitude of the corresponding sample at the coder input. Hence, a signal at half the sampling frequency, a frequency $f$, will occur at the decoder output if and only if frame synchronization is incorrect.

The arrangement shown in FIG. 1 is designed to achieve correct frame synchronization in a 7-digit single-channel PCM system operating with an 8 kHz. sampling or frame repetition rate employing a 56 kHz. clock (bit rate). Decoder 1 is provided with frame pulses at the 8 kHz. sampling rate by feeding the 56 kHz. clock to a divide-by-seven frequency divider 2. The unfiltered output of the decoder is fed to a bandpass filter 3 having a pass band centered at 4 kHz. The output of filter 3 is used to trigger a one-shot pulse generator 4. The pulse output of generator 4 is applied to OR-gate 5 and is inserted as any additional clock pulse into the 56 kHz. bit clock pulse stream.

If the decoder is correctly synchronized no 4 kHz. signal is detected in the unfiltered decoder output and no extra pulses are produced by generator 4. If frame synchronization is lost, the 4 kHz. component appears in the decoder output, a pulse is generated by generator 4 and inserted into the bit clock pulse stream. This has the effect of moving the frame pulse applied to the decoder formed by one bit position—always in the same direction of course. This process is repeated until correct frame synchronization is achieved when the 4 kHz. component disappears and no more pulses are inserted in the bit clock stream. In the worst case condition, six extra pulses are needed to achieve synchronization with a seven-digit code.

The components used in the arrangement of FIG. 1 are in themselves quite conventional. Pulse generator consists of Schmitt trigger 4*a* which is switched by the filter output and which in turn fires monostable circuit 4*b*. The monostable circuit pulse output is the pulse which is applied to gate 5.

The arrangement includes a feedback circuit via monostable circuit 6 having a comparatively long time constant compared to the sampling rate, the output of which controls INHIBIT gate 3*a*, coupled to the filter output, following the insertion of an extra pulse in the bit clock stream long enough to prevent a succession of such additional pulses being generated while the gradual disappearance of the 4 kHz. signal occurs. It effectively lengthens the response time of the circuit.

It will be appreciated that a certain time must be allowed for the 4 kHz. component to build up to be detected and also time for it to die away when correct synchronization is achieved. Compromises must be made between the Q of filter 3 and the threshold of trigger 4*a*. For example, a high Q retards the voltage buildup at the filter output and lengthens the time taken to regain synchronization. Also in practice some 4 kHz. signal will be present in the decoder output even when the frame synchronization is correct, tending to switch trigger 4*a*. This is probably due to nonlinearity in the overall coder-decoder transfer characteristic. Too low a Q for the filter will result in quick correction, but the ability to achieve and maintain synchronization is rather erratic, and depends to a certain extent on whether high or low signal levels are being transmitted and the sensitivity of the trigger threshold of trigger 4*a*.

While we have described above the principles of our invention in connection with specific apparatus, it is to be clearly understood that this description is made only by way of example.

We claim:

1. A frame synchronization arrangement for single-channel PCM systems comprising:
 an input receiving groups of binary pulses, each of said groups representing only the amplitude of a quantized sample of intelligence conveyed by said single channel;
 a decoder coupled to said input providing as its output signal a pulse having an amplitude proportional to the amplitude represented by each of said groups of binary pulses and a signal component having a frequency equal to half the frame repetition rate of said system when an out-of-synchronization condition of said decoder is present;
 first means coupled to the output of said decoder to detect said signal component; and
 second means coupled to the output of said first means and said decoder responsive to the detection of said signal component to adjust the operation of said decoder to establish a frame-synchronized condition for said decoder.

2. An arrangement according to claim 1, wherein said first means includes
 a bandpass filter having a pass band centered about the frequency of said signal component.

3. An arrangement according to claim 1, wherein said second means includes
 a source of bit clock pulses,
 pulse generator means coupled to said first means to produce a control pulse upon detection of said signal component, and
 third means coupled to said source and said pulse generator means to insert said control pulse into the stream of said bit clock pulses as an additional clock pulse to adjust the timing of the operation of said decoder.

4. An arrangement according to claim 3, wherein said pulse generator means includes
 a Schmitt trigger coupled to said first means, and
 a monostable device coupled to said trigger to produce said control pulse.

5. An arrangement according to claim 3, wherein said third means includes
 an OR gate.

6. An arrangement according to claim 1, wherein said first means includes
 a bandpass filter having a pass band centered about the frequency of said signal component; and
 said second means includes
 a source of bit clock pulses,
 pulse generator means coupled to said filter to produce a control pulse upon detection of said signal component, and
 third means coupled to said source and said pulse generator means to insert said control pulse into the stream of said bit clock pulses as an additional clock pulse to adjust the timing of the operation of said decoder.

7. An arrangement according to claim 3, further including fourth means coupled between the output of said pulse generating means and said first means to permit only one of said control pulse for each frame of said system.

8. An arrangement according to claim 7, wherein said first means includes
 a bandpass filter having a pass band centered about the frequency of said signal component.

9. An arrangement according to claim 7, wherein said fourth means includes
 a monostable device having a time constant greater than the period of each of said frame coupled to the output of said pulse-generating means, and
 an INHIBIT gate having its inhibit input coupled to said monostable device and its regular input coupled to the output of said first means.

10. An arrangement according to claim 7, wherein said first means includes
 a bandpass filter having a pass band centered about the frequency of said signal component; and
 said fourth means includes
 a monostable device having a time constant greater than the period of each of said frame coupled to the output of said pulse-generating means, and
 an INHIBIT gate having its inhibit input coupled to said monostable device and its regular input coupled to the output of said filter.

* * * * *